United States Patent
Subramanian et al.

(10) Patent No.: US 11,983,441 B2
(45) Date of Patent: May 14, 2024

(54) ARBITRATION OF COMMANDS BETWEEN NON-VOLATILE MEMORY STORAGE AND REMOTE HOSTS

(71) Applicant: XILINX, INC., San Jose, CA (US)

(72) Inventors: Ramesh Ramaiya Subramanian, Hyderabad (IN); Chaitanya Kallakuri, Hyderabad (IN)

(73) Assignee: XILINX, INC., San Jose, CA (US)

( * ) Notice: Subject to any disclaimer, the term of this patent is extended or adjusted under 35 U.S.C. 154(b) by 107 days.

(21) Appl. No.: 17/703,890

(22) Filed: Mar. 24, 2022

(65) Prior Publication Data
US 2023/0305747 A1 Sep. 28, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

| 10,552,058 | B1* | 2/2020 | Jadon | G06F 3/0647 |
| 11,429,444 | B1* | 8/2022 | Rahul | G06F 13/1668 |
| 2021/0132832 | A1* | 5/2021 | So | G06F 13/20 |
| 2022/0261183 | A1* | 8/2022 | Horspool | G06F 3/061 |

OTHER PUBLICATIONS

U.S. Appl. No. 15/092,490, filed Apr. 6, 2016 Entitled "Flow Control Between Non-Volatile Memory Storage and Remote Hosts Over a Fabric".

* cited by examiner

*Primary Examiner* — Zhuo H Li
(74) *Attorney, Agent, or Firm* — Patterson + Sheridan, LLP (57) ABSTRACT

An integrated circuit includes a front-end interface, a back-end interface, a controller, and arbiter circuitry. The front-end interface communicates with a remote host over a front-end fabric. The back-end interface communicates with nonvolatile memory (NVM) subsystems over a back-end fabric. The controller is coupled between the front-end interface and the back-end interface. The controller receives commands from the remote host for the NVM subsystems, and stores the commands in queue pairs associated with the NVM subsystems. The arbiter circuitry receives data for the queue pairs, and selects a command from a first queue pair of the queue pairs based on a comparison of the data to one or more thresholds. The selected command is outputted to one or more of the NVM subsystems.

20 Claims, 6 Drawing Sheets

ARBITRATION OF COMMANDS BETWEEN NON-VOLATILE MEMORY STORAGE AND REMOTE HOSTS

TECHNICAL FIELD

Examples of the present disclosure generally relate to electronic circuits and, in particular, to the arbitration of commands between non-volatile memory storage devices and remote hosts.

BACKGROUND

The popularity of solid state drives (SSDs) and exponential growth of network content has led to the emergence of all-non-volatile memory (NVM) storage systems, such as SSD arrays. The popularity of SSDs has also lead to the creation of a NVM Express® (NVMe) specification for SSDs connected to a Peripheral Component Interconnect (PCI) Express® bus referred to as "PCIe." The merger of NVMe and network-based storage systems, referred to herein as NVMe Over Fabric (NVMe-oF), leads to the concept of making PCIe-based NVMe SSDs accessible via a network fabric using a remote direct memory access (RDMA) transport.

An NVMe-oF system includes one or more remote hosts connected to an NVMe-oF system via a network interface card (NIC) through a network fabric, such as an Ethernet fabric. On the backend side, the NVMe-oF system manages multiple SSDs, each of which can be shared with multiple remote hosts. The remote hosts issue read and write commands to the NVMe-oF system over the network by layering the NVMe protocol over an RDMA protocol. The NVMe-oF system forwards these read and write commands to the back-end SSDs based on an internal mapping. The RDMA protocol allows data exchange without actively involving central processing units (CPUs) of the remote hosts, thereby reducing CPU overhead. One technique for processing the commands is to allocate the commands to the one or more queues of the SSDs as the commands are received. However, allocating the commands as the commands are receive may overwhelm the resources available to the queue, reducing the performance of the NVMe-oF system.

SUMMARY

Techniques for arbitrating commands within NVM Express® (NVMe) Over Fabric (NVMe-oF) systems are described herein. For example, an NVMe-oF system includes arbiter circuitry that determines which NVM subsystem to provide a command based on various thresholds, ensuring the resources within the NVMe-oF system are not overwhelmed, improving the performance of the NVMe-oF system.

In one example, an integrated circuit (IC) comprises a front-end interface, a back-end interface, a controller, and arbiter circuitry. The front-end interface communicates with a remote host over a front-end fabric. The back-end interface communicates with nonvolatile memory (NVM) subsystems over a back-end fabric. The controller is coupled between the front-end interface and the back-end interface. The controller receives commands from the remote host for the NVM subsystems, and stores the commands in queue pairs associated with the NVM subsystems. The arbiter circuitry receives data for the queue pairs, and selects a command from a first queue pair of the queue pairs based on a comparison of the data to one or more thresholds. The selected command is outputted to one or more of the NVM subsystems.

In one example, a method includes receiving commands from a remote host for NVM subsystems. The remote host communicates with an integrated circuit via a front-end fabric, and the NVM subsystems communicate with the integrated circuit via a back-end fabric. Further, the method includes storing the commands in queue pairs, and selecting, via arbiter circuitry, a command of a first queue pair of the queue pairs based on a comparison of data associated with the first queue pair with one or more thresholds. The method further includes communicating the selected command to at least one of the NVM subsystems.

In one example, an arbiter includes arbiter circuitry. The arbiter circuitry receives data for queue pairs. The queue pairs store commands associated with NVM subsystems. The commands are received from a remote host via a front-end interface over a front-end fabric, and communicated to the NVM subsystems via a back-end interface over a back-end fabric. The arbiter circuitry further selects a command from a first queue pair of the queue pairs based on a comparison of data associated with the first queue pair to one or more thresholds. The selected command is outputted to at least one of the NVM subsystems.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Techniques for arbitrating commands between non-volatile memory storage devices and remote hosts are described herein. The techniques described herein determine which non-volatile memory storage device to access based on the available system resources of the non-volatile storage devices. In an example, arbitration circuitry determines the available resources of each non-volatile storage device, and selects which of the non-volatile storage devices to access (e.g., communicate a read or write command) based on the available resources. This technique ensures that the resources of one or more non-volatile storage devices are not overwhelmed, improving the performance of the corresponding system. For example, by applying arbitration to the received commands, the command response time of the corresponding system is improved, while reducing lag time. These and further aspects are discussed below with respect to the drawings.

Figure 1:
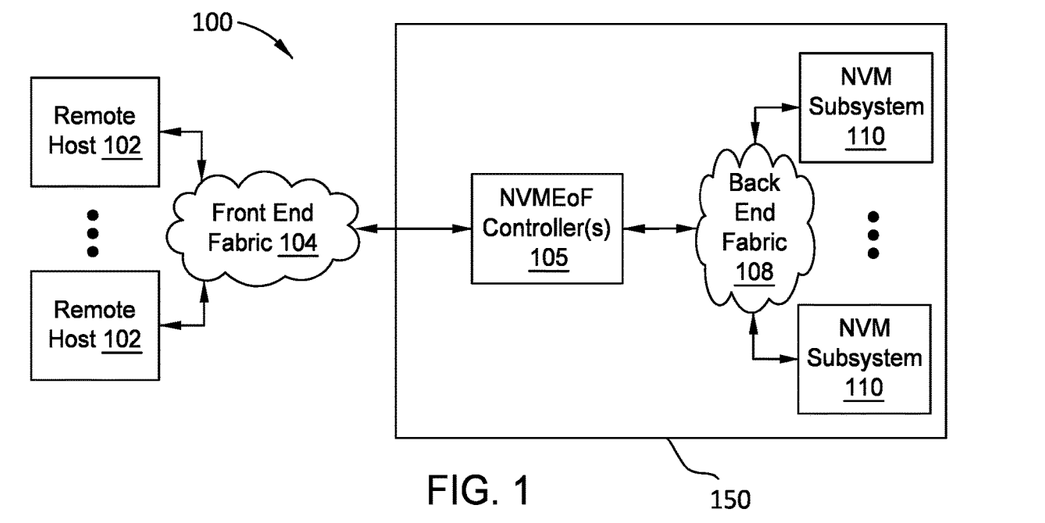
FIG. 1 is a block diagram depicting a computer system according to an example.

FIG. 1 is a block diagram depicting a computer system 100 according to an example. The computer system 100 includes one or more remote hosts 102, a front-end fabric 104, an NVMe-oF controller 105 (also referred to as "controller 105"), a back-end fabric 108, and one or more nonvolatile memory (NVM) subsystems 110. For the purposed of clarity by example, a single NVMe-oF controller 105 is described. However, it is to be understood that the computer system 100 can include a plurality of NVMe-oF controllers 105.

The remote hosts 102 are coupled to the controller 105 through the front-end fabric 104. The front-end fabric 104 can employ an Ethernet data link layer or InfiniBand® (IB) data link layer, among others. The remote hosts 102 can communicate with the controller 105 over the front-end fabric 104 using a remote direct memory access (RDMA) transport, such as RDMA over Converged Ethernet (RoCE), IB, Internet Wide Area RDMA (iWARP), or the like. The controller 105 is coupled to the NVM subsystems 110 through the back-end fabric 108. The back-end fabric 108 can employ a different transport than the front-end fabric 104. In an example, the back-end fabric 108 is a Peripheral Component Interconnect (PCI) Express® (PCIe) fabric. The controller 105 provides an interface between the remote hosts 102 and the NVM subsystems 110. The controller 105 is coupled to the NVM subsystems 110 through the back-end fabric 108. The NVM subsystem 110 is configured to persistently store data using a NVM technology, such as solid state disk (SSD) storage technology.

In an example, the NVM subsystem 110 includes a register interface compliant with an NVM Express® (NVMe) specification, such as NVM Express rev. 1.2. The controller 105, the back-end fabric 108, and the NVM subsystems 110 are collectively referred to as a target system 150. The remote hosts 102 issue commands targeting the target system 150 using NVMe layered over RDMA transport. The controller 105 receives the commands and provides an interface between the different transports used by the front-end and back-end fabrics 104 and 108.

Figure 2:
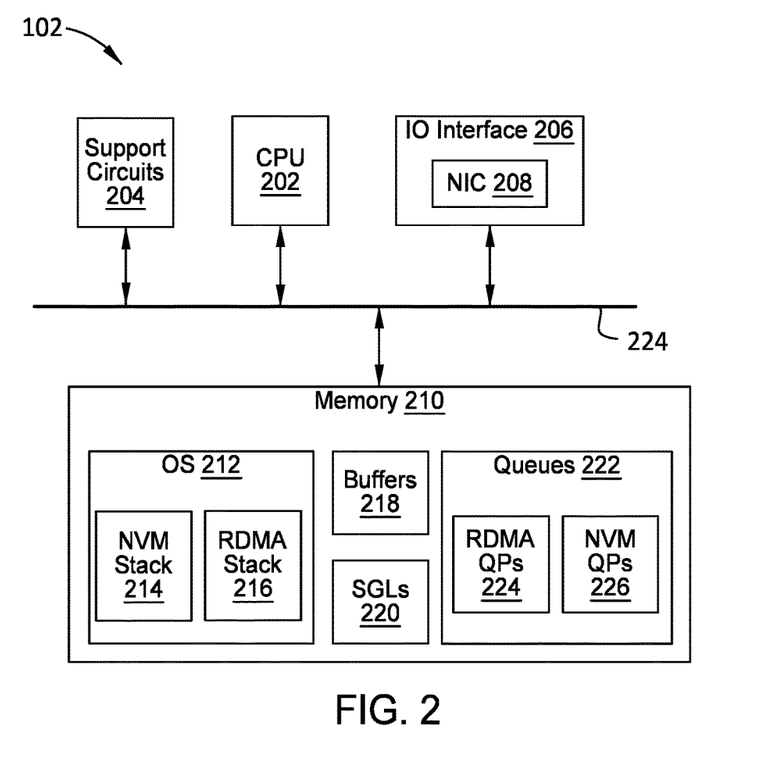
FIG. 2 is a block diagram depicting a remote host according to an example.

FIG. 2 is a block diagram depicting a remote host 102 according to an example. The remote host 102 is a computer system or device external to the target system 150. The remote host 102 includes a central processing unit (CPU) 202, one or more support circuits 204, an input/output (IO) interface 206, and a memory 210 coupled to a bus 224. The CPU 202 can include one or more microprocessors. The support circuits 204 can include conventional cache, power supplies, clock circuits, data registers, IO interfaces, and the like. The IO interface 206 can be coupled to various IO devices, which can include conventional keyboard, mouse, and the like. The IO interface 206 can also include a network interface card (NIC) 208 configured for communicating through the front-end fabric 104. As such, the NIC 208 is configured to communicate using an RDMA transport.

The memory 210 may store all or portions of one or more programs and/or data to implement aspects of the remote host 102 described herein. The memory 210 can include one or more of random access memory (RAM), read only memory (ROM), magnetic read/write memory, FLASH memory, solid state memory, or the like as well as combinations thereof. The memory 210 can store an operating system (OS) 212, buffers 218 (sometimes referred to as remote buffers 218), scatter gather lists (SGLs) 220, and queues 222. The OS 212 can include an NVM stack 214 and an RDMA stack 216. Applications can interact with the OS 212 and use the NVM stack 214 to read data from or write data to the target system 150. In an example, the NVM stack 214 complies with an NVMe specification and supports some necessary NVMe commands to implement the controller solution. The NVM stack 214 can interact with the RDMA stack 216 to layer NVMe commands over an RDMA transport for communication to the target system 150 over the front-end fabric 104. The memory 210 can store various queues 222. The RDMA stack 216 can maintain RDMA queue pairs (QPs). The NVM stack 214 can maintain NVM queue pairs 226. Notably, the NVM queue pairs 226 can include one or more pairs of submission queues and completion queues to store entries indicating submission and completion of issued commands. The NVMe commands can reference SGLs 220, which in turn reference the buffers 218. The RDMA stack 216 reads data to and from the buffers 218 using RDMA transactions.

Figure 3:
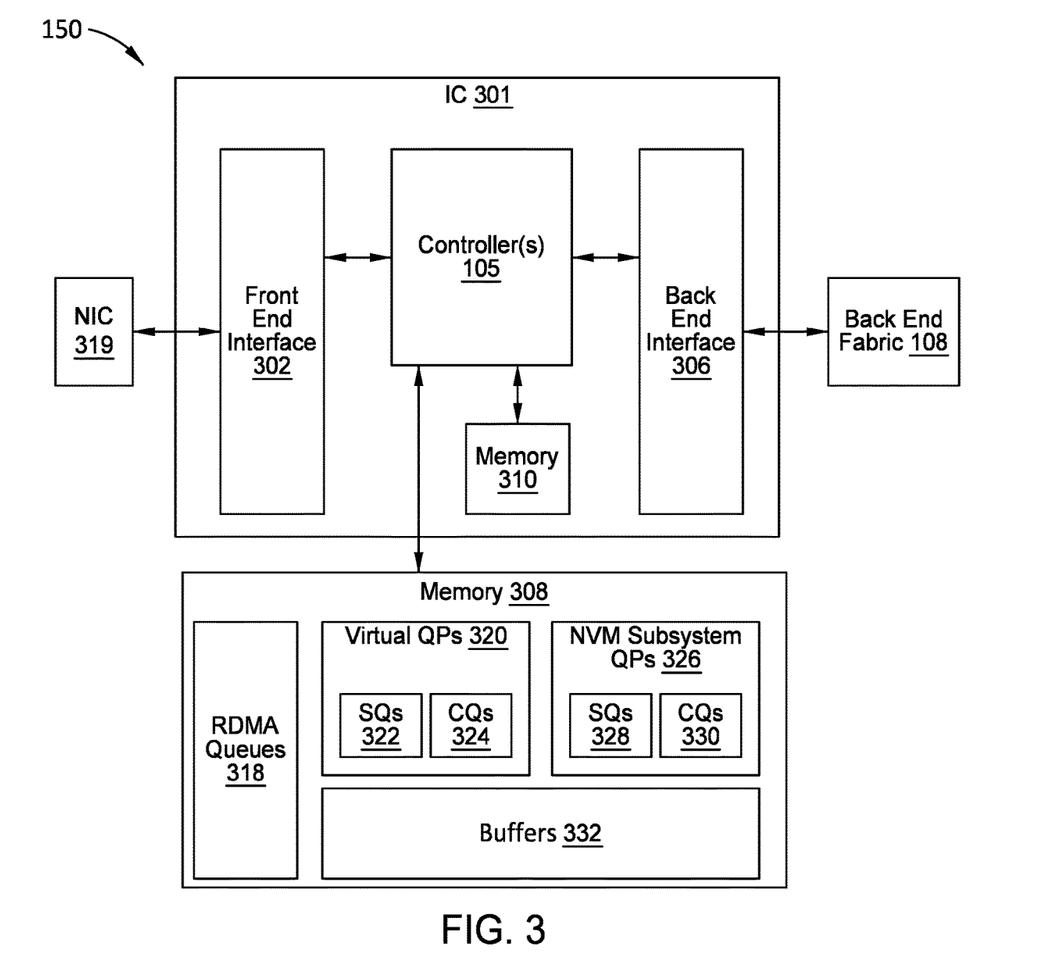
FIG. 3 is a block diagram depicting a target system according to an example.

FIG. 3 is a block diagram depicting a portion of the target system 150 according to an example. The target system 150 includes an integrated circuit (IC) device 301. In an example, the IC device 301 is a programmable IC, such as a field programmable gate array (FPGA). Alternatively, the IC device 301 can be an application specific integrated circuit (ASIC). The IC device 301 includes a front-end interface 302, the controller 105, and a back-end interface 306. Although the IC device 301 is shown as having a single controller 105, the IC device 301 can include more than one controller 105. The front-end interface 302 can be coupled to a NIC circuitry 319, which is turn is coupled to the front-end fabric 104. In the example shown, the NIC circuitry 319 is external to the IC device 301. In other examples, the NIC circuitry 319 can be implemented within the IC device 301. The back-end interface 306 is configured for communication with one or more NVM subsystems 110 through the back-end fabric 108. For example, the back-end interface 306 can be a PCIe fabric port. The controller 105 can interface with a memory 308 external to the IC device 301. In some examples, the controller 105 can also interface with a memory 310 implemented within the IC device 301 in addition to the memory 308.

The controller 105 provides an interface between the remote hosts 102 coupled to the front-end fabric 104 and the NVM subsystem 110 coupled to the back-end fabric 108. The controller 105 provides virtual submission and completion queues for the remote hosts 102. The virtual queues are backed by a single shared memory. In other examples, the virtual queues are backed by more than one shared memory. The controller 105 also provides for flow control to control access among the remote hosts 102 to the limited resources of the shared memory. In this manner, the controller 105 can support a large number of remote hosts given limited memory resources.

The memory 308 stores RDMA queues 318, virtual queue pairs 320, NVM subsystem queue pairs 326, and buffers (e.g., buffers 332). The memory 308 may be configured similar to that of the memory 210 of FIG. 2. The buffer 332 may be First-In-First-Out (FIFO) buffer. In other examples, the buffer 332 may be another type of buffer. For example, the buffer 332 may be configured to reorder the commands stored within buffers 332. The RDMA queues 318 are configured similar to the RDMA stack 216 of FIG. 2. Further, the virtual queue pairs 320 and the NVM subsystem queue pairs 326 are configured similar to the NVM stack 214 and/or the NVM queue pairs 226. In operation, the controller 105 stores RDMA instructions received from the remote hosts 102, and RDMA instructions to be sent to the remote hosts 102, in the RDMA queues 318. The controller 105 extracts NVMe commands from RDMA instructions received from the remote hosts 102. The controller 105 maintains at least one virtual queue pair 320 for each of the remote hosts 102.

Each of the virtual queue pairs 320 includes a submission queue (SQ) 322 and a completion queue (CQ) 324. The virtual queue pairs 320 are virtual in that the virtual queue pairs 320 do not store the actual NVMe command data. Rather, the virtual queue pairs 320 store queue attributes that describe virtual queues backed by the buffers 332. The queue attributes can include, for example, head pointers and tail pointers that specify the heads and tails of the virtual queues.

The actual data for the virtual queues is stored in the buffers 332. The controller 105 stores the commands in a buffer 332. As the commands are received and stored in the buffer 332, the controller 105 updates the corresponding SQs 322 when inserting commands (e.g., adjusts tail pointers). The NVM subsystem 110 consumes commands from the buffer 332 (e.g., on a first-in-first out basis or in any other order). The controller 105 also updates the corresponding SQs 322 when commands are consumed (e.g., adjusts head pointers). The controller 105 also maintains completion data in a buffer 332. The controller 105 stores completion data from the NVM subsystem 110 in the buffer 332 and updates the corresponding CQs 324 (e.g., adjusts tail pointers). The controller 105 also updates the corresponding CQs 324 when completion data is consumed and sent to the remote hosts 102 (e.g., adjusts head pointers).

The NVM subsystem 110 can maintain SQs 328 and CQs 330 in the memory 308. Commands consumed from the buffers 332 can be inserted into the SQs 328. Completion data can be inserted into the CQs 330 upon completion. Completion data can be consumed from the CQs 330 and inserted into the buffers 332. As opposed to the SQs 322 and the CQs 324 of the virtual queue pairs 320, the SQs 328 and the CQs 330 can be non-virtual queues that store command and completion data. The controller 105 also implements flow control for commands from the remote hosts 102.

Figure 4:
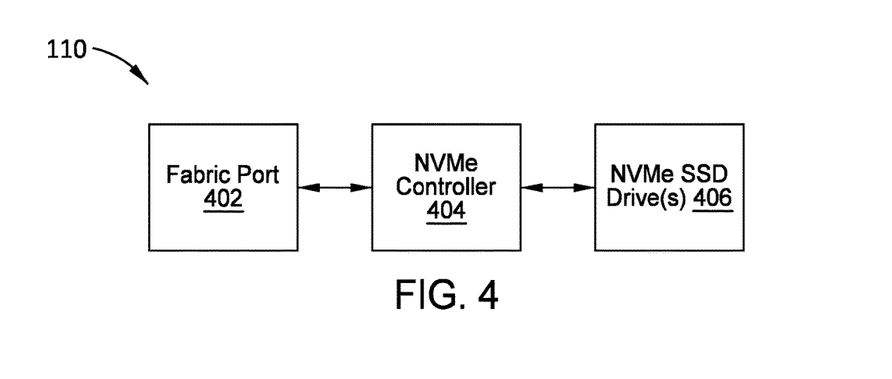
FIG. 4 is a block diagram depicting a nonvolatile memory (NVM) subsystem according to an example.

FIG. 4 is a block diagram depicting an NVM subsystem 110 according to an example. The NVM subsystem 110 includes a fabric port 402, an NVMe controller 404, and one or more NVMe SSD devices 406. The fabric port 402 provides an interface between the NVMe controller 404 and the back-end fabric 108. For example, the fabric port 402 can be a PCIe port. The NVMe controller 404 implements an NVMe register interface for the NVMe SSD devices 406. The NVMe controller 404 processes the various NVMe commands, such as read commands, write commands, and the like. The NVMe controller 404 consumes the SGLs 312 when executing the commands to perform DMA transactions with the controller 105.

Figure 5:
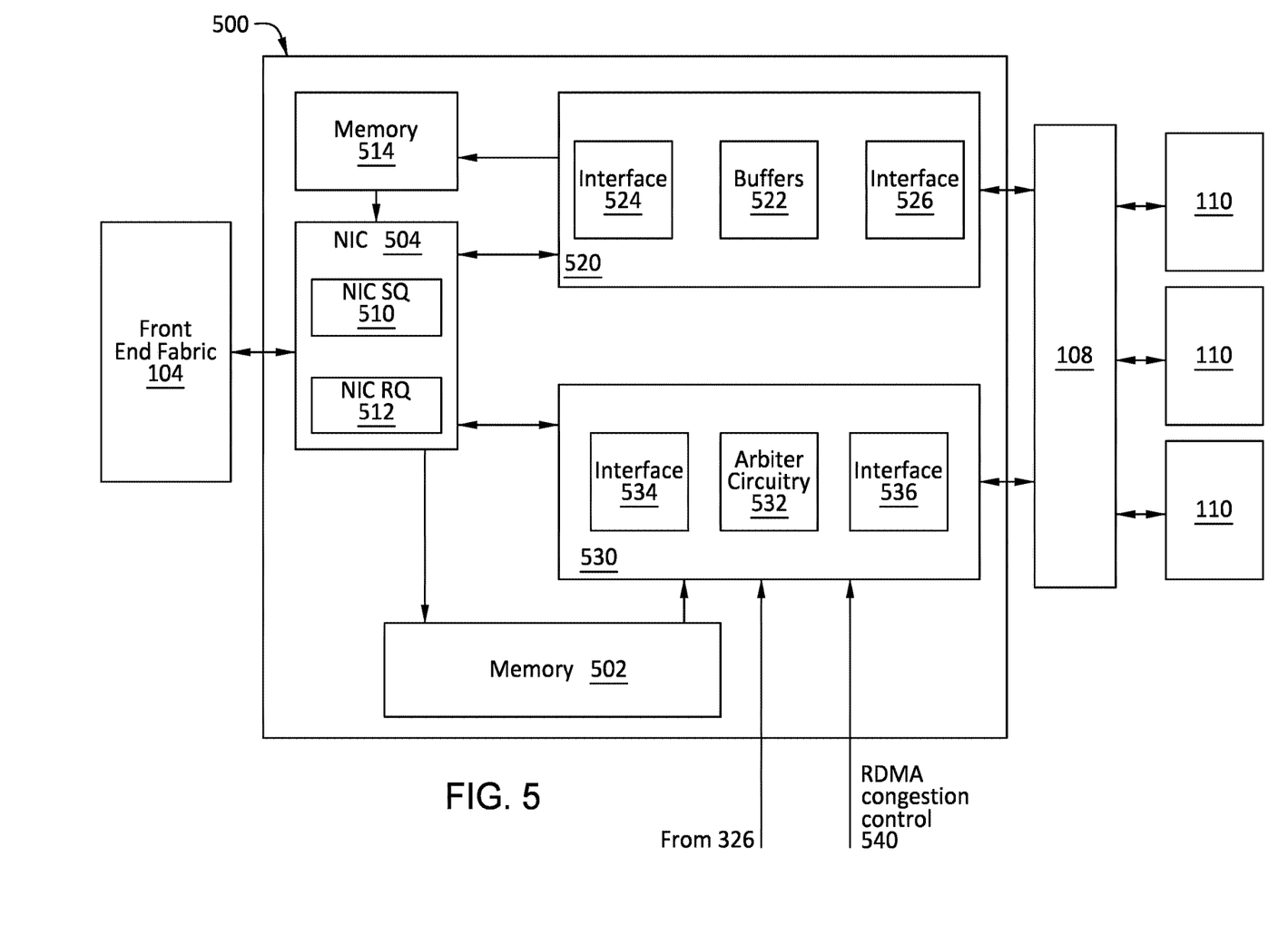
FIG. 5 is a block diagram depicting an integrated circuitry device according to an example.

FIG. 5 shows a block schematic diagram of an IC device 500, according to one or more examples. The IC device 500 is configured similar to the IC device 301 of FIG. 3. As shown in FIG. 5, the IC device 500 includes NIC circuitry 504, NVMe-oF SQ circuitry 520, NVMe-oF RQ circuitry 530, memory 514, and the memory 502. The NVMe-oF SQ circuitry 520 and NVMe-oF RQ circuitry 530 are part of a controller (e.g., the controller 105). In one example, the NIC circuitry 504 may be external to the IC device 500. The NIC circuitry 504 is configured similar to that of the NIC circuitry 319 of FIG. 3. In one or more examples, the memory 502 is configured similar to the memory 310.

In one example, the data transfers between the IC device 500, the NVM subsystems 110, and the remote hosts 102 has a minimum page size of about 4 KB. In other examples, the minimum page size is greater than about 4 KB. The commands communicated from the remote hosts 102 to the NVM subsystems 110 to instruct the NVM subsystems 110 to read or write data. Each command (NVMe command) is one or more pages of data to be transferred between the remote hosts 102 and the NVM subsystems 110. The IC device 500 coverts for commands containing SGL to PRP tables to control the communication between the remote hosts 102 and the NVM subsystems 110. The PRP tables allow for independent addressing of buffers (e.g., the buffers 522). By utilizing the SGL to PRP conversion process, the IC device 500 implements a pool of fixed sized (e.g., about 4 KB) buffers (e.g., the buffers 522) for the exchange of data between the remote hosts 102 and NVM subsystems 110. In one example, a 128 KB sequential write data with a single SLG entry is partitioned into 32 4 KB entries of a PRP table. Partitioning the data into 4 KB partitions allows for the implementation of a shared buffer architecture across all of the remote hosts 102 and the NVM subsystems 110. In one example, the amount of memory allocated in the shared buffer architecture is 1 MB (e.g., 4 KB*266 partitions). In other examples, the memory allocated may be greater than or less than 1 MB. In one example, the amount of memory allocated for a read command is 266 KB (e.g., 4 KB*64). In one example, the buffers 522 store data received from the NVM subsystems 110, and when the data is sent to a remote host 102, the associated buffer 522 is freed or flushed from the buffer 522.

In one example, as the control overhead of the commands is low, the commands received from the remote host 102 are stored in a memory (e.g., the memory 308 of FIG. 3). Control information associated with the commands is stored in the memory 502. As is described in more detail in the following, this information is processed by arbiter circuitry 532 to determine how the NVM subsystems 110 are accessed.

The NIC circuitry 504 is configured similar to the NIC 319 of FIG. 3. As shown in FIG. 5, the NIC circuitry 504 includes NIC SQ circuitry 510 and NIC RQ circuitry 512. The NIC SQ circuitry 510 stores commands to be sent to the front-end fabric 104. The NIC RQ circuitry 512 stores commands received via the front-end fabric 104.

NVMe-oF SQ circuitry 520 includes buffers 522, interface circuitry 524, and interface circuitry 526. The buffers 522 include data buffers, a read buffer manager circuit, write buffer manager circuit, and completion manager circuit. The interface circuitry 524 controls the communication of data from the NIC circuitry 504 and the NVMe-oF SQ circuitry 520. In one example, the interface circuitry 524 is an advanced extensible interface (AXI). The interface circuitry 524 may be a master AXI and the interface circuitry 526 may be a slave AXI. Further, the interface circuitry 524 controls the communication of data to the memory 514. In one example, the interface circuitry 524 receives read and write commands from the NIC circuitry 504. For example, the interface circuitry 524 receives read and write commands from the NIC SQ circuitry 510. The interface circuitry 526 communicates read and write commands, and data to the NVM subsystems 110 from the buffers 522 via the back-end fabric 108. In one or more examples, the buffers 522 are configured similar to the buffers 332 of FIG. 3. In one or more examples, the interface circuitry 524 and the interface circuitry 526 correspond to the front-end interface 302 of FIG. 3.

NVMe-oF RQ circuitry 530 includes an arbiter including arbiter circuitry 532, interface circuitry 534, and interface circuitry 536. The interface circuitry 534 controls the communication of command data from the NIC circuitry 504. In one example, the interface circuitry 534 controls the communication of command data from the NIC RQ circuitry 512. In one example, the interface circuitry 534 is an AXI. The interface circuitry 534 may be a master AXI and the interface circuitry 536 may be a slave AXI. Further, the interface circuitry 534 controls communication with the memory 502. The interface circuitry 536 communicates read and write commands, to the NVM subsystems 110 via the back-end fabric 108. The interface circuitry 534 and the interface circuitry 536 corresponds to the back-end interface 306 of FIG. 3.

As illustrated in FIG. 5, the arbiter circuitry 532 of the arbiter is implemented as part of the IC device 500. In other examples, the arbiter circuitry 532 includes dedicated circuit elements that control the arbitration of commands (e.g., read and write commands) to the NVM subsystems 110. In one example, the arbiter circuitry 532 receives data regarding the status of the buffers 522 and the NVM subsystems 110 (e.g., the NVM subsystem queue pairs 326), and arbitrates the communication of read and write commands and data to the NVM subsystems 110 based on the data of the buffers 522 and the NVM subsystems 110. In one example, the commands stored within the memory 502 are communicated to the buffers 522 and/or the NVM subsystems 110 based on corresponding data. Further, the arbiter circuitry 532 receives RDMA congestion control signal 540 and controls the communication of commands based on the RDMA congestion control signal 540.

In one example, the NVMe-oF RQ circuitry 530 circuitry receives a command from the NIC circuitry 504 (e.g., the NIC RQ circuitry 512) via RQ doorbells. When an RQ doorbell's tail pointer is changed, the RQ doorbell indicates that there is one or more commands waiting to be processed. As will be described in more detail in the following, the arbiter circuitry 532 determines whether or not there are outstanding commands in each queue pair (e.g., the NVM subsystem queue pairs 326) of the NVM subsystems 110. A command in the queue pair is identified by the RQ Producer Index (RQPI) being different from the RQ Consumer Index (RQCI) within the queue pair. The difference in RQPI and RQCI indicates that head and tail pointers of a queue are different, indicating the presence of commands to be processed. For the selected queue pair, the arbiter circuitry 532 determines whether or not there are outstanding commands based on command control information stored within the memory 310.

In one example, the IC device 500 receives and translates the capsules received from the remote hosts 102 to write commands, read commands, and flush commands from the queue pairs (e.g., the NVM subsystem queue pairs 326). The write and read commands contain additional control information for the associated data. For example, the write and read commands include fields such as scatter gather list (SGL) fields, number of logical blocks to read or write, and the starting logical block to perform the read or write.

The commands are stored within a queue pair (e.g., the NVM subsystem queue pairs 326) and contain a unique identifier. In one example, the buffer 522 is used to store commands and data to be communicated to the NVM subsystems 110 and receive data from the NVM subsystems 110. However, as each sequential read and write command may supports a large amount of data transfers, the size of buffers 522 that may be needed to store the read and write commands is large. In many instances the amount of localized memory that is needed to move data to the NVM subsystems is prohibitive. For example, due to the large amounts of localized memory, the cost of the overall system is increased. Further, due to the increased memory requirements, such systems cannot be executed within lower cost, reduced memory sized systems. In one example, the use of the arbiter circuitry 532 within the IC device 500 allows for an NVMe interface to be employed in lower cost, reduced memory sized systems. The arbiter circuitry 532 is self-regulating, and uses dynamic feedback to monitor end-to-end command-to-completions and accordingly regulate the corresponding operations.

The arbiter circuitry 532 utilizes dynamic feedback to monitor end to end communication between the remote hosts 102 and the NVM subsystems 110. Further, the arbiter circuitry 532 regulates the end to end communication between the remote hosts 102 and the NVM subsystems 110. The feedback is both frontend (i.e., between the remote hosts 102 and IC device 500), and back-end (i.e., between the IC device 500 and the NVM subsystems 110). The arbiter circuitry 532 regulates the communication between the remote hosts 102 and the NVM subsystems 110 by monitoring the feedback received for each of the active NVM subsystem queue pairs 326 of the NVM subsystems 110. An active queue pair is a queue pair that has an outstanding command to the NVM subsystems 110, and/or a queue pair having an outstanding RDMA read/write data transfer to a remote host 102. In one example, as is described in greater detail in the following, the arbiter circuitry 532 performs various processes to select one or more commands within a corresponding queue.

In one example, the interface circuitry 524 and the interface circuitry 534 form at least a portion of a front-end interface (e.g., the front-end interface 302 of FIG. 3). Further, the interface circuitry 526 and 536 form at least a portion of a back end interface (e.g., the back-end interface 306 of FIG. 3).

Figure 6:
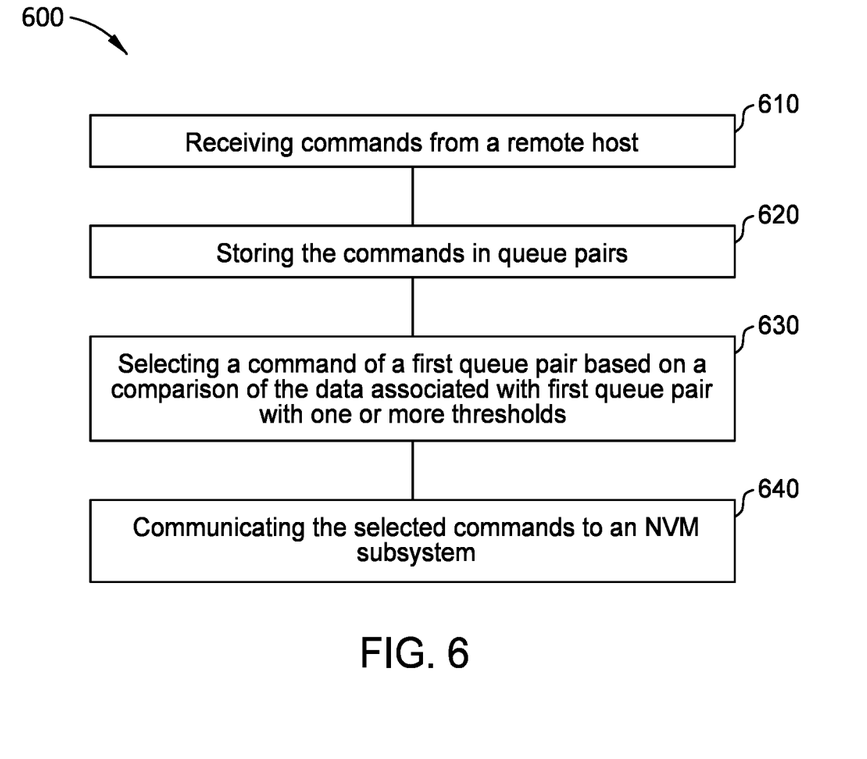
FIG. 6 is a flow diagram depicting a method of arbitrating NVMe commands according to an example.

FIG. 6 illustrates a flowchart of a method 600 for arbitrating commands for NVM subsystems, according to one or more examples. At block 610, commands are received from a remote host for NVM subsystems are received. For example, the target system 150 receives commands from the remote hosts 102 via the front-end fabric 104. The target system 150 communicates within the NVM subsystems 110 via back-end fabric 108.

At block 620 of the method 600, the commands are stored in queue pairs. For example, the commands, or command data, is stored in the NVM subsystem queue pairs 326. The commands are stored based on the association between the NVM subsystem queue pairs 326 and the NVM subsystems 110. For example, a command for a first one of the NVM subsystems 110 is stored in a corresponding one of the NVM subsystems queue pairs 326.

At block 630, a command of a first queue pair is selected based on a comparison of data associated with the first queue pair with one or more thresholds. For example, the arbiter circuitry 532 compares data associated with a first one of the NVM subsystem queue pairs 326 with one or more thresholds, and selects a command based on the comparison. The method 700 of FIGS. 7A and 7B describe various methods for comparing data associated with the NVM subsystem queue pairs 326 to one or more thresholds.

At block 640, a selected command is communicated to an NVM subsystem. For example, the target system 150 communicates the selected command to the associated NVM subsystem via the back end interface 306 and the back-end fabric 108.

Figure 7A:
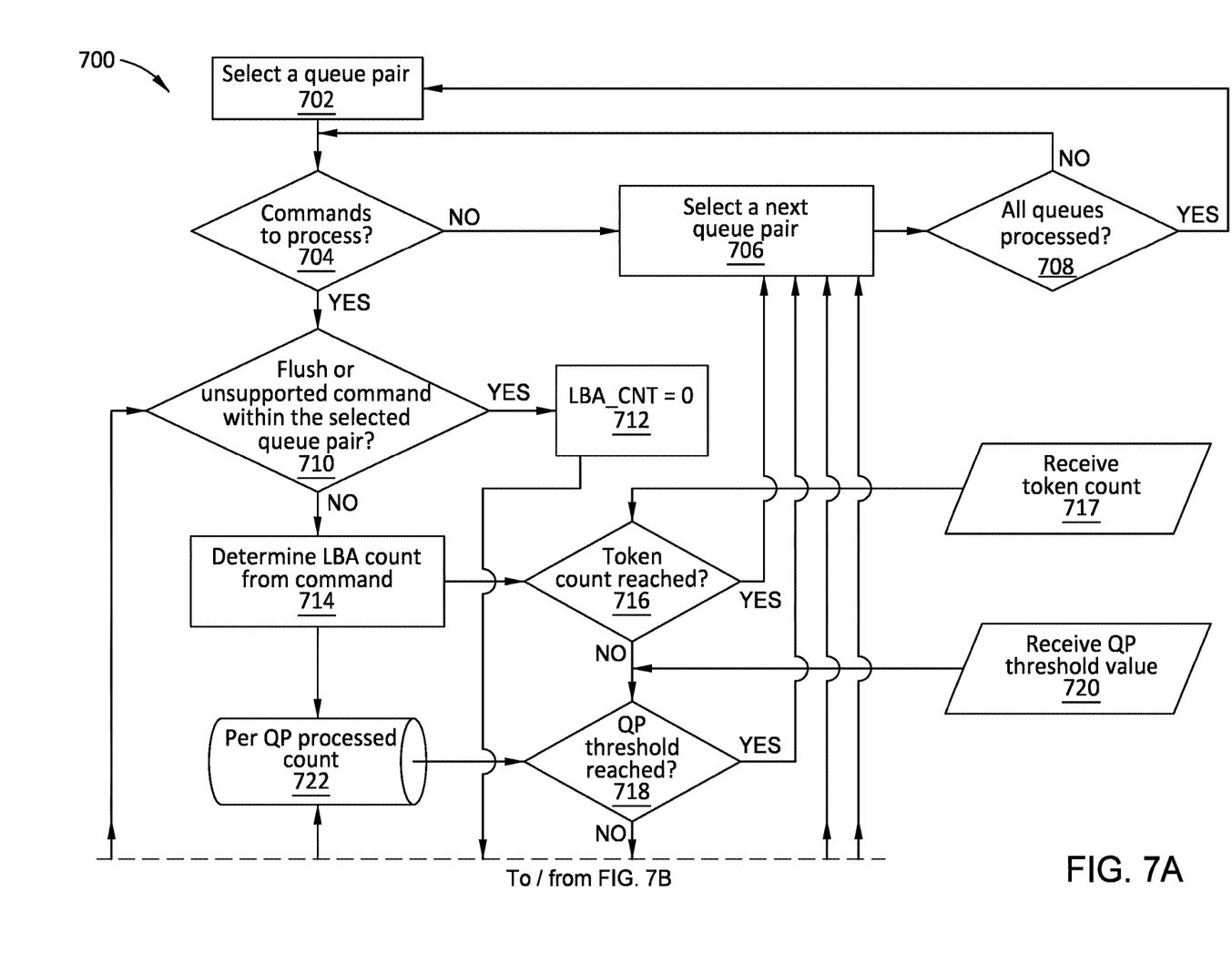
FIGS. 7A and 7B illustrate a flow diagram depicting a method of processing NVMe commands according to an example.
Figure 7B:
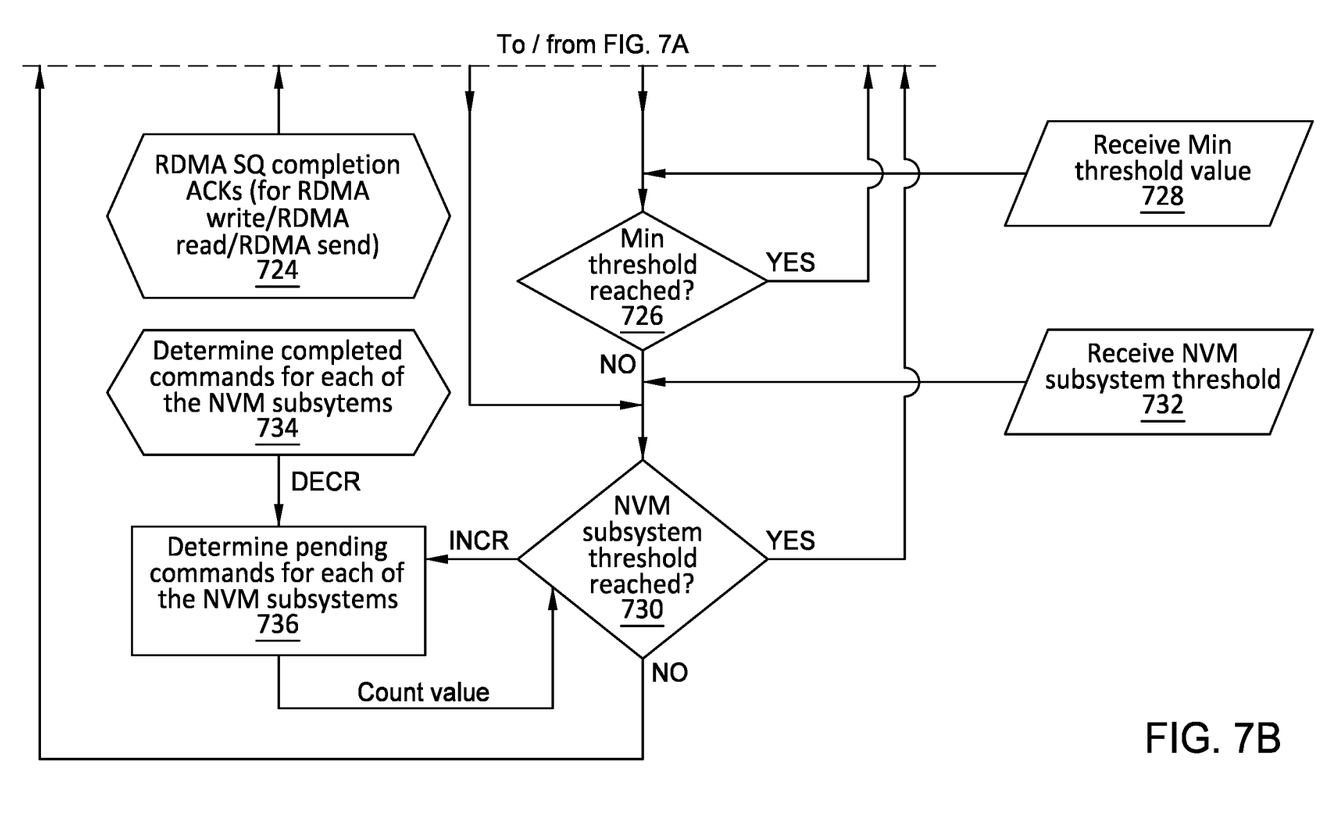

FIGS. 7A and 7B illustrate a flowchart of a method 700 for selecting commands from a queue pair. The method 700 is performed by the arbiter circuitry 532. The method 700 is performed during one or more arbitration cycles. During each arbitration cycle, the NVM subsystem queue pairs 326 are analyzed by the arbiter circuitry 532 to determine which command to select and communicate to the NVM subsystems 110. At block 702, the arbiter circuitry 532 selects a first queue pair (e.g., a first NVM subsystem queue pair 326) of the NVM subsystems 110. At block 704 the arbiter circuitry 532 determines whether or not a command is pending (e.g., an outstanding commands) within the selected queue pair to process. If the selected queue pair does not contain commands for processing, the next queue pair is selected at block 706. At block 708 the arbiter circuitry 532 determines whether or not all NVM subsystem queue pairs 326 of the NVM subsystems 110 have been processed. If all of the NVM subsystem queue pairs 326 have been processed, the method 700 starts over at block 702. If all of the commands within the NVM subsystem queue pairs 326 have not been processed, the method proceeds to block 710.

At block 710, the arbiter circuitry 532 determines whether or not there is a flush command or an unsupported command within the selected NVM subsystem queue pair 326. In one example, flush and unsupported commands are not stored within data buffers (e.g., data buffers 522). Read and write commands are stored in data buffers. Based on the determination that there is a flush or unsupported command, the logical block address (LBA) count (LBA_CNT) is set to 0 at block 712 by the arbiter circuitry 532.

Further based on the determination that there is not a flush or unsupported command within the selected queue pair, an LBA count is determined from the commands within selected NVM subsystem queue pair 326, at block 714. In one example, the LBA count corresponds to the commands within the selected NVM subsystem queue pair 326. For example, a read command may have 8 LBAs. In another example, a read command may have more or less than 8 LBAs.

At block 716, the arbiter circuitry 532 determines whether or not a token count is reached. The token count corresponds to a maximum number of tokens assigned to each NVM subsystem queue pair 326. The token count is received by the arbiter circuitry 532 at block 717. The token count may be stored within a memory (e.g., the memory 502, the memory 308, or the memory 310) and is obtained by the arbiter circuitry 532 from the memory. The maximum number of tokens may be set to 16. In other examples, the maximum number of tokens may be greater than or less than 16. The value of the token count corresponds to the number of commands a NVM subsystem queue pair 326 is able to process. Each command is associated with a number of LBAs (e.g., the LBA count), and a number of tokens based on the number of LBAs. For example, a command with 8 LBAs (e.g., an LBA count of 8) uses a token for each LBA, and a token for the RDMA send command. Accordingly, a command with 8 LBAs uses 9 tokens. Accordingly, if the next received command by the target system 150 has more than 6 LBAs (e.g., an LBA count of greater than 6), the arbiter circuitry 532 determines that the token count has been reached at block 416. Based on the token count being reached, the next queue pair is selected at block 706. In one example, the blocks 710, 712, 714, and 716 are performed during each arbitration cycle of the arbiter circuitry 532.

Based on the determination that the token count is not reached at block 716 by the arbiter circuitry 532, the arbiter circuitry 532 determines whether or not a queue pair threshold has been reached at block 718. The arbiter circuitry 532 determines whether or not the queue pair threshold arbitration cycles has been reached based on a queue pair threshold value received at block 720. The queue pair threshold value may be stored within a memory (e.g., the memory 308, the memory 310, or the memory 502) and is obtained by the arbiter circuitry 532 from the memory. In one example, the queue pair threshold check of block 718 is applied across all arbitration cycles of the arbiter circuitry 532. In one example, a NVM subsystem queue pair 326 associated with a larger number of LBAs per received command is not assigned more bandwidth than a queue pair associated with a smaller number of LBAs per received command. Each NVM subsystem queue pair 326 has a maximum number (e.g., a threshold number) of LBAs that are allowed to be processed. For example, a block 720 a queue pair threshold value of 64 is received. In other examples, the queue pair threshold is greater than or less than 64. Accordingly, a NVM subsystem queue pair 326 stops receiving arbitration from the arbiter circuitry 532 if the selected NVM subsystem queue pair 326 has already received the threshold number of arbitration cycles. In one example, if a selected NVM subsystem queue pair 326 has a less than a threshold value of cycles, and the tokens allowed in the current arbitration cycle have expired, the selected NVM subsystem queue pair 326 is selected during the next arbitration cycle.

In one example, the arbiter circuitry 532 determines whether or not a queue pair threshold is reached at block 718 based on a queue pair count value determined for each NVM subsystem queue pair 326. For example, at block 722 the arbiter circuitry 532 determines a per queue pair count value based on the RDMA SQ completion acknowledgements (ACKs). The arbiter circuitry 532 receives the RDMA SQ ACKs at block 724. For example, in an NVMe read command case, when data is written by the NVM subsystem 110, a corresponding counter is incremented by 1. When a remote host 102 reads data, the counter is decremented by 1. Further, in an NVMe write command case, when data is written by the remote host 102, a corresponding counter is incremented by 1. When the NVM subsystem 110 reads the data, counter is decremented by 1. In one or more examples, when the value of the counter reaches a threshold, processing of the selected queue pair is stopped until the outstanding count reaches a value which is less than the threshold value.

Based on a determination that the queue pair threshold has been reached, the next queue pair is selected at block 706. Based on a determination that the queue pair threshold has not been reached at block 718, the arbiter circuitry 532 determines whether or not a minimum threshold is reached at block 726. The minimum threshold corresponds to a number of buffers (e.g., the buffers 522) that have been used. In one or more examples, each buffer is a 4 KB buffer and is a unit of transaction to the NVM subsystem 110. A queue pair has a maximum of "N" buffers allocated to the queue pair, where "N" is based on a programmed threshold value. When the outstanding transactions reach "N", the queue pair stops receiving commands. The arbiter circuitry 532 determines whether or not a minimum threshold is reached based on a minimum threshold value received at block 728. The minimum threshold value may be stored within a memory (e.g., the memory 308, the memory 310, or the memory 502) and is obtained by the arbiter circuitry 532 from the memory. At block 726, the arbiter circuitry 532 determines whether or not the processed number of buffers (e.g., buffers 522) are greater than a minimum threshold. In one example, the minimum threshold value is 32. Based on the arbiter circuitry 532 determining that the processed number of buffers is greater than the minimum threshold, the next queue pair is selected at block 706. Based on the arbiter circuitry 532 determining that the processed number of buffers is not greater than the minimum threshold, the method proceeds to block 730 of the method 700.

At block 730 of the method 700, the arbiter circuitry 532 determines whether or not an NVM subsystem threshold has been reached. The NVM subsystem threshold check is applied across all arbitration cycles. The NVM subsystem threshold check ensures that each NVM subsystem 110 is provided (e.g., loaded) with a number of commands based on performance, and that commands are distributed across all of the NVM subsystems 110. The arbiter circuitry 532 receives the NVM subsystem threshold at block 732. The NVM subsystem threshold corresponds to a number of commands that a NVM subsystem 110 is able to process. The arbiter circuitry 532 obtains the NVM subsystem threshold from a memory (e.g., the memory 308, the memory 310, or the memory 502). In one or more examples, the commands received from a remote host 102 are stored in a memory device (e.g., the memory 310, the memory 502, or another memory device). The commands stored in the memory device are kept significantly higher than the commands posted the NVM subsystems 110. Such a process allows greater flexibility to distribute commands across the NVM subsystems 110. When the commands (e.g., pending commands) of a NVM subsystem 110 reaches a maximum value, no further commands are sent to the NVM subsystem 110, even though more commands may be stored within the memory device for the NVM subsystem 110. The NVM subsystems 110 are given commands based on whether the queue pair associated with the NVM subsystems 110 reaches a corresponding threshold or not. If a queue pair associated with an NVM subsystem 110 doesn't reach the corresponding threshold, i.e., not saturated, more commands can be given to that NVM subsystem 110 to saturate the bandwidth of the NVM subsystem 110.

At block 730, the arbiter circuitry 532 compares the command count associated with the NVM subsystem 110 to the NVM subsystem threshold. In one example, the arbiter circuitry 532 determines the completed commands for each NVM subsystem 110 based on completed command data within the corresponding NVM subsystem queue pair 326 at block 734. Further, the arbiter circuitry 532 determines the number of outstanding commands for each NVM subsystem 110 based on the number of completed commands. At block 736 a pending command count is determined for each NVM subsystem 110 based on the number of completed commands. The pending command count is the number of outstanding commands for each NVM subsystem 110. The arbiter circuitry 532 determines a NVM subsystem count value based on the number of pending commands for an NVM subsystem 110.

In one example, a NVM subsystem threshold is 240. In other examples, the NVM subsystem threshold is greater than or less 240. The arbiter circuitry 532 compares the NVM subsystem count value to the NVM subsystem threshold. Based on the NVM subsystem count value being greater than the NVM subsystem threshold value, the next queue pair is selected at block 706. Based on the NVM subsystem count value being less than the NVM subsystem threshold value, the method 700 proceeds to block 710.

In one or more examples, a target system (e.g., the target system 150) that utilizes the arbiter circuitry 532 allows for reduced buffer spaces to be used as compared to conventional target systems. For example, by employing the arbiter circuitry 532, IC device 500 is able to use a maximum of two thousand virtual buffer spaces when communicating with the NVM subsystems 110. In one example, a NVM subsystem 110 is able to support 32 or 64 commands. Accordingly, an IC device that supports two thousand virtual buffer spaces across 24 NVM subsystems 110 allows for more than 64 commands to be maintained for each of the NVM subsystems without negatively affecting the performance of a typical communication network.

Further, by utilizing the arbiter circuitry 532, the number of commands that each NVM subsystem queue pair 326 is able to post to a corresponding cache of a corresponding NVM subsystem 110 is maintained below a threshold number, improving the response performance of the overall system. For example, random read/write operations for each command can be about 4 KB, or a minimum page size transfer. Accordingly, each command results in two RDMA transfers. A first RDMA transfer for the 4 KB data and a second RDMA transfer for the NVMe completion notification. Accordingly, the cache may be set to 4 KB. By employing the arbiter circuitry 532, the cache of queue pair may be maintained below a filled state, adding additional flexibility of occupancy within the cache. In one example, when cache occupancy of a queue pair is greater than a threshold, the arbiter circuitry 532 stops processing commands until the cache occupancy of a queue pair is below a threshold.

In one or more examples, commands may be processed out of the order in which the commands are received. Out of order processing improves the performance of the read command and write command workload. In one example, processing write commands includes fetching data from a memory of one of the remote hosts 102. When a write command is followed by a read command, the round-trip latencies to fetch data from the remote hosts 102 slows down the processing of the following read commands. In one example, to improve performance, write commands are not immediately issued to the NVM subsystems 110 when received. The write commands are allocated to buffers (e.g., the buffers 522), and the data is requested from the remote hosts 102. The remote hosts 102 write all of the data to the buffers. After the data is written to the buffers, a doorbell is rung to the corresponding NVM subsystem 110 to inform the NVM subsystem 110 that a write command is to be processed. Out of order processing mitigates dead lock conditions. For example, when employing out of order processing, a remote host 102 stops responding due to error conditions, the command is not issued to a NVM subsystem 110, allowing other commands to be processed without causing a deadlock condition. In one example, the arbiter circuitry 532 selects the queue pair associated with the write command when the buffer is available for storing the write data. Further, a timeout-based error condition and queue pair fatal based error condition are checked and applied to free up any allocated buffer.

In one or more examples, per queue pair congestion control is supported. When congestion is detected, an explicit congestion notification (ECN) bit is set in the current frame. When the IC device 500 detects a frame with ECN, the IC device 500 generates congestion notification packets (CNP) for a queue pair to the source node based on the RDMA congestion control signal 540. A congestion notification frame is forwarded to the corresponding application software. When congestion is detected, the queue pair threshold values (e.g., token count, QP threshold value, min threshold value, and/or NVM subsystem threshold) may be adjusted. For example, since each data transfer is of a page size, reducing threshold values results in a reduced rate for the queue pair. Further, when the congestion is no longer existent for a queue pair, the threshold values (e.g., token count, QP threshold value, min threshold value, and/or NVM subsystem threshold) may be increased.

In the above, techniques for arbitrating commands within NVMe-oF systems are described. A target system of an NVMe-oF system include arbitration circuitry that arbitrates the read and write commands received from a remote hosts to ensure that the resources within the NVMe-oF system are not overwhelmed. For example, the arbitration circuitry determines which NVM subsystem to provide a command based on the available resources of each of the NVM subsystems. Arbitrating the commands within an NVMe-oF system improves the performance of the NVMe-oF system by ensuring that the resources of any one or more of the NVM subsystems are not overwhelmed.

While the foregoing is directed to specific examples, other and further examples may be devised without departing from the basic scope thereof, and the scope thereof is determined by the claims that follow.

What is claimed is:

1. An integrated circuit comprising:
   a front-end interface configured for communication with a remote host over a front-end fabric;
   a back-end interface configured for communication with nonvolatile memory (NVM) subsystems over a back-end fabric;
   a controller coupled between the front-end interface and the back-end interface, the controller configured to:
   receive commands from the remote host for the NVM subsystems; and
   store the commands in queue pairs associated with the NVM subsystems; and
   arbiter circuitry configured to:
   receive queue pair data associated with the NVM subsystems and a status of buffers storing command and completion data; and
   select a command from a first queue pair of the queue pairs based on a comparison of the queue pair data and the command and completion data to one or more thresholds, wherein the selected command is outputted to one or more of the NVM subsystems.

2. The integrated circuit of claim 1, wherein the arbiter circuitry is further configured to:
   compare a logical block address count for the first queue pair to a first threshold; and
   select the command from the first queue pair based on the logical block address count being less than the first threshold.

3. The integrated circuit of claim 2, wherein the logical block address count corresponds to a number of commands within the first queue pair.

4. The integrated circuit of claim 1, wherein the arbiter circuitry is further configured to:
   compare a number of pending commands associated with a first NVM subsystem of the NVM subsystems to a second threshold; and
   select the command from the first queue pair based on the number of pending commands being less than the second threshold.

5. The integrated circuit of claim 4, wherein the arbiter circuitry is further configured to determine the number of pending commands based on a number of completed commands for the first NVM subsystem.

6. The integrated circuit of claim 1, wherein the arbiter circuitry is further configured to:
   compare a processed number of buffers associated with the first queue pair to a third threshold; and
   select the command of the first queue pair based on the processed number of buffers being less than the third threshold.

7. The integrated circuit of claim 1, wherein the command from the first queue pair is selected based on a determination that a second queue pair of the queue pairs does not include a command to process.

8. A method comprising:
   receiving commands from a remote host for nonvolatile memory (NVM) subsystems, wherein the remote host is configured to communicate with an integrated circuit via a front-end fabric, and the NVM subsystems are configured to communicate with the integrated circuit via a back-end fabric;
   storing the commands in queue pairs;
   receiving, via arbiter circuitry, queue pair data associated with the NVM subsystems and a status of buffers storing command and completion data;
   selecting, via the arbiter circuitry, a command of a first queue pair of the queue pairs based on a comparison of the queue pair data and the command and completion data with one or more thresholds; and
   communicating the selected command to at least one of the NVM subsystems.

9. The method of claim 8 further comprising:
   comparing a logical block address count for the first queue pair to a first threshold; and
   selecting the command from the first queue pair based on the logical block address count being less than the first threshold.

10. The method of claim 9, wherein the logical block address count corresponds to a number of commands within the selected queue pair.

11. The method of claim 8 further comprising:
    comparing a number of pending commands associated with a first NVM subsystem of the NVM subsystems to a second threshold; and
    selecting the command from the first queue pair based on the number of pending commands associated with the NVM subsystem being less than the second threshold.

12. The method of claim 11 further comprising determining the number of pending commands based on a number of completed commands for the first NVM subsystem.

13. The method of claim 8 further comprising:
comparing a processed number of buffers associated with the first queue pair to a third threshold; and
selecting the command of the first queue based on the processed number of buffers being less than the third threshold.

14. The method of claim 8, wherein the command of the first queue pair is selected based on a determination that a second queue pair of the queue pairs does not include a command to process.

15. An arbiter comprising arbiter circuitry, the arbiter circuitry configured to:
receive queue pair data and a status of buffers storing command and completion data, queue pairs of the queue pair data configured to store commands associated with nonvolatile memory (NVM) subsystems, the commands received from a remote host via a front-end interface over a front-end fabric and communicated to the NVM subsystems via a back-end interface over a back-end fabric; and
select a command from a first queue pair of the queue pairs based on a comparison of the queue pair data and the command and completion data to one or more thresholds, wherein the selected command is outputted to at least one of the NVM subsystems.

16. The arbiter of claim 15, wherein the arbiter circuitry is further configured to:
compare a logical block address count for the first queue pair to a first threshold; and
select the command from the first queue pair based on the logical block address count being less than the first threshold.

17. The arbiter of claim 16, wherein the logical block address count corresponds to a number of commands within the first queue pair.

18. The arbiter of claim 16, wherein the arbiter circuitry is further configured to:
compare a number of commands associated with a first NVM subsystem of the NVM subsystems to a second threshold; and
select the command from the first queue pair based on the number of commands associated with the NVM subsystem being less than the second threshold.

19. The arbiter of claim 18, wherein the arbiter circuitry is further configured to determine the number of commands based on a number of completed commands for the first NVM subsystem.

20. The arbiter of claim 16, wherein the arbiter circuitry is further configured to:
compare a processed number of buffers associated with the first queue pair to a third threshold; and
select the command of the first queue based on the processed number of buffers being less than the third threshold.

* * * * *